W. RUARK.
SANITARY FLOOR DRAIN.
APPLICATION FILED MAY 13, 1910.
980,681.
Patented Jan. 3, 1911.
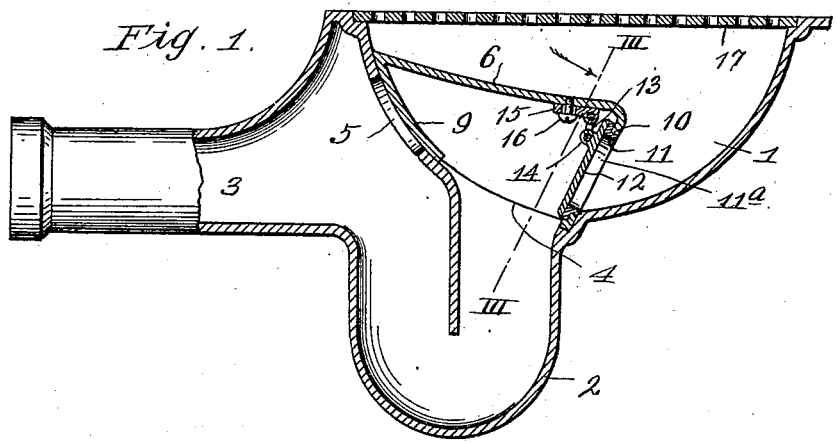
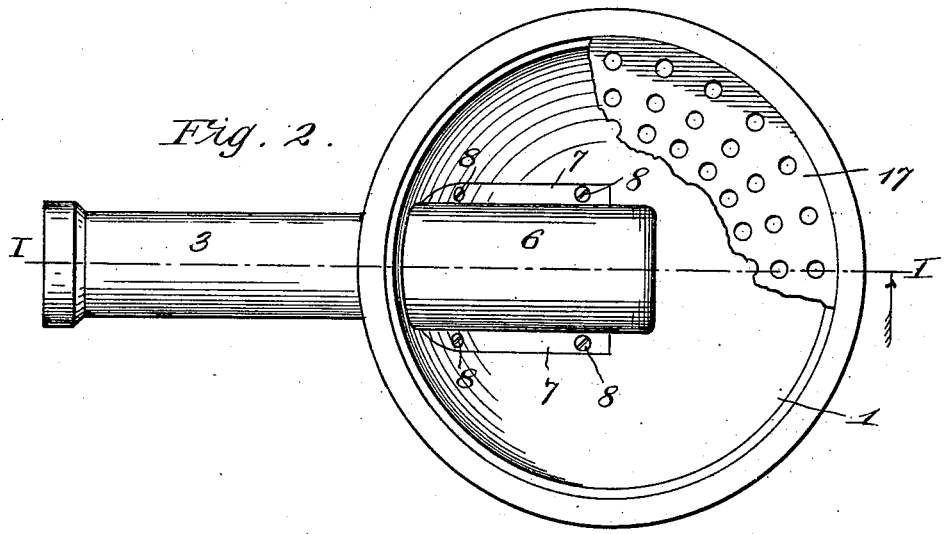
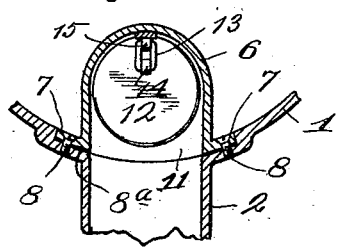
WITNESSES:
R. E. Hamilton.
M. Cox.
INVENTOR:
W<u>m</u> Ruark,
BY
F. G. Fischer,
ATTORNEY.
THE NORRIS PETERS CO., WASHINGTON, D. C.

UNITED STATES PATENT OFFICE.

WILLIAM RUARK, OF KANSAS CITY, KANSAS, ASSIGNOR OF ONE-HALF TO JAMES W. CARTER, OF KANSAS CITY, KANSAS.

SANITARY FLOOR-DRAIN.

980,681. Specification of Letters Patent. Patented Jan. 3, 1911.

Application filed May 13, 1910. Serial No. 561,257.

*To all whom it may concern:*

Be it known that I, WILLIAM RUARK, a citizen of the United States, residing at Kansas City, in the county of Wyandotte and State of Kansas, have invented certain new and useful Improvements in Sanitary Floor-Drains, of which the following is a specification.

My invention relates to improvements in sanitary floor drains, and is especially adapted for the drainage of cellar floors.

The objects of the invention are to provide a drain which may be cheaply manufactured; one in which all the parts are readily accessible so that they can be cleaned out in case they become choked or stopped up, and one which will readily open to permit the outflow and immediately close after its passage to prevent entrance into the cellar of noxious vapors or back-water.

In order that the invention may be fully understood reference will now be made to the accompanying drawing, in which:

Figure 1 represents a vertical central section of my improved drain on line I—I of Fig. 2. Fig. 2 is a broken plan view of same. Fig. 3 is a sectional detail on line III—III of Fig. 1.

In carrying out the invention I employ a basin 1 provided with an integral U-shaped trap 2 and a discharge tube 3, said basin having an outlet opening 4 communicating with the induction leg of the trap and a clean-out opening 5 communicating with the eduction leg of the trap and the discharge tube 3.

6 designates a hood covering openings 4 and 5, said hood being provided with oppositely-disposed flanges 7, secured to basin 1 by screws 8. A gasket 8ᵃ is interposed between flanges 7 and the adjacent wall of the basin to form a gas and water-tight joint. The upper end of hood 6 has an integral downwardly-extending leaf 9 to further close the opening 5 and prevent entrance into the hood and basin of noxious vapors. Hood 6 is provided at its front side with an opening 10 leading from basin 1 into the induction leg of trap 2, said opening being lined with a valve-seat 11 to receive a valve 12 provided for the purpose of normally closing opening 11ᵃ in the valve-seat, to prevent gases or back-water from flowing into the basin through the opening 11ᵃ. The front side of the hood and the valve-seat 11 are inclined as shown in Fig. 1, and in order to render said valve self-closing it is freely suspended from a link 13 loosely engaging a lug 14 on the valve and a lug 15 adjustably secured to the underside of the hood by a screw 16. Thus the slightest pressure of water within the basin will open the valve so that said water may escape, and in order that all of the water within the basin may escape therefrom the lower portion of seat 11 is arranged flush with the bottom of the basin as shown in Fig. 1.

The upper portion of the basin is normally closed by a strainer 17 which may be readily removed when desired. Should the discharge tube 3 become choked, access may be readily had thereto through the clean-out opening 5 by removing strainer 17 and hood 6.

Having thus described my invention what I claim is:

1. A device of the character described, consisting of a basin having outlet and clean-out openings, a U-shaped trap communicating with said openings, a discharge tube communicating with one leg of said trap and the clean-out opening, a hood covering the openings in the basin and provided with an outlet opening communicating with the basin and the induction leg of the trap, and a valve normally closing said outlet opening in the hood.

2. A device of the character described, consisting of a basin having outlet and clean-out openings, a trap communicating with said openings, a discharge tube communicating with the eduction leg of the trap and the clean-out opening of the basin, a hood covering the openings in the basin and provided with a leaf to close communication between the clean-out opening and the hood, said hood also having an outlet opening communicating with the basin and the induction leg of the trap, and a self-closing valve for the outlet opening of the hood.

3. A device of the character described, consisting of a basin having outlet and clean-out openings, a trap communicating with said openings, a discharge tube communicating with the eduction leg of the trap and the clean-out opening of the basin, a hood removably secured to the basin to cover the outlet and clean-out openings therein, said hood having an outlet opening communicating with the basin and the induction leg of the trap, an inclined valve-seat at the outlet opening in the hood, a self-closing valve normally engaging said seat, and means freely supporting said valve.

4. A device of the character described, consisting of a basin having outlet and clean-out openings, a trap communicating with said openings, a discharge tube communicating with the eduction leg of the trap and the clean-out opening of the basin, a hood removably secured to the basin to close the outlet and clean-out openings therein, said hood having an outlet opening communicating with the basin and the induction leg of the trap, a valve to close the outlet opening in said hood, a link freely suspending said valve, and an adjustable lug secured to the hood and supporting said link.

In testimony whereof I affix my signature, in the presence of two witnesses.

WILLIAM RUARK.

Witnesses:
F. G. FISCHER,
M. COX.